Figure 3:
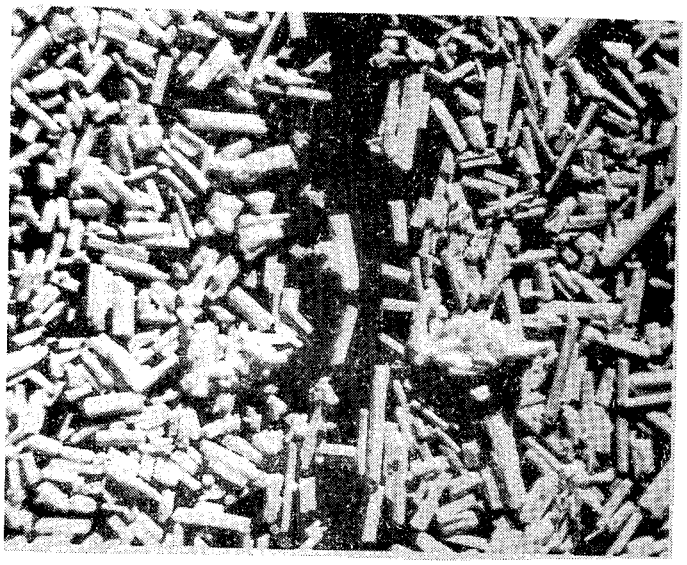

March 14, 1967  A. B. GANCY  3,309,171
DENSIFICATION OF SODA ASH BY VAPOR HYDRATION
Filed Feb. 11, 1966  2 Sheets-Sheet 1
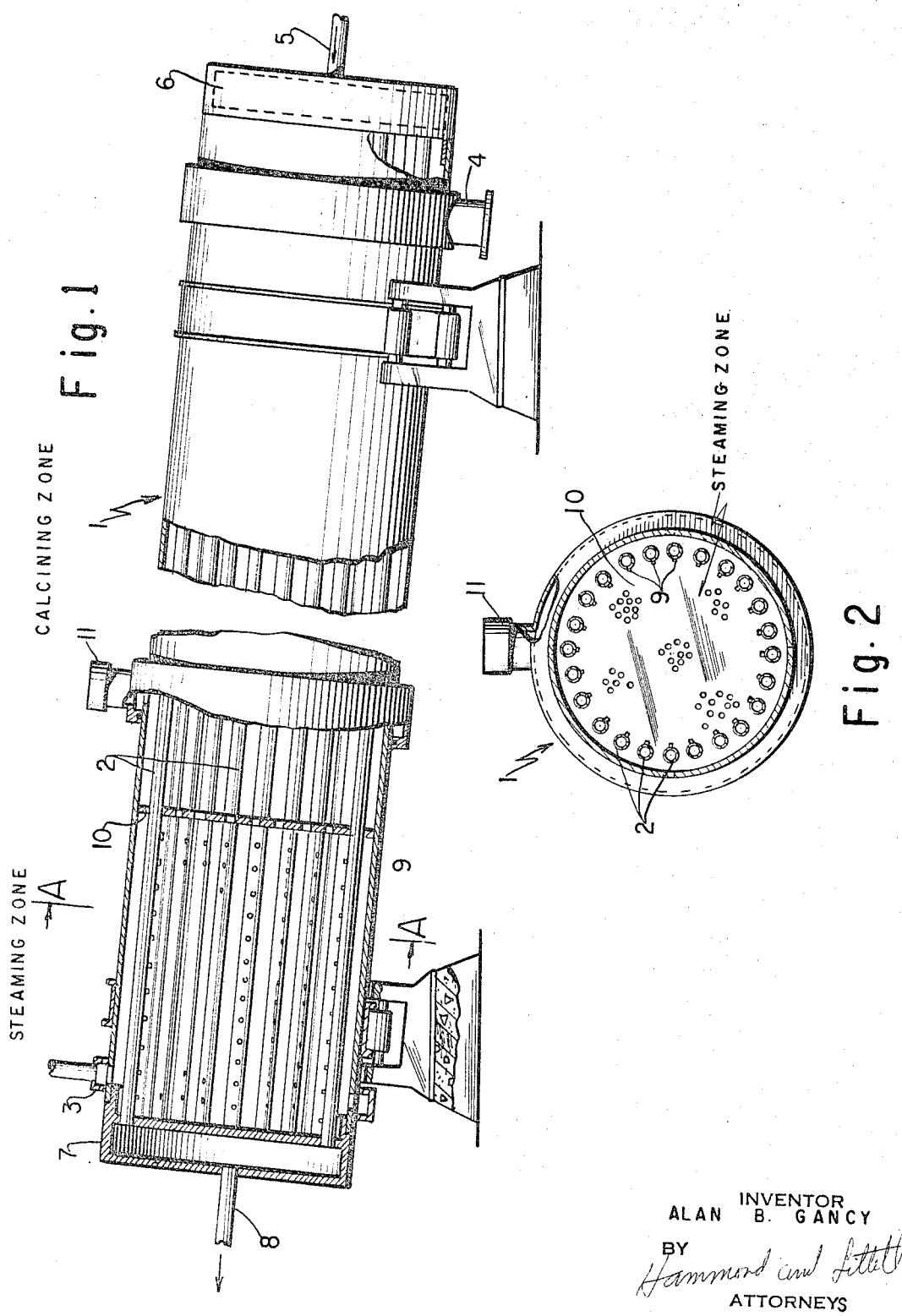
INVENTOR
ALAN B. GANCY
BY
Hammond and Littell
ATTORNEYS

HIGH DENSITY     LOW DENSITY
      MAGNIFICATION— 12X.

United States Patent Office 3,309,171
Patented Mar. 14, 1967

3,309,171
DENSIFICATION OF SODA ASH BY VAPOR HYDRATION
Alan B. Gancy, West Acton, Mass., assignor to Intermountain Research & Development Corporation, Cheyenne, Wyo., a corporation of Wyoming
Filed Feb. 11, 1966, Ser. No. 536,500
6 Claims. (Cl. 23—63)

The present application is a continuation-in-part application of copending, commonly assigned U.S. application Ser. No. 222,876, filed September 11, 1962, now abandoned.

This invention relates to an improvement in the densification of soda ash and in particular relates to the preparation of a high density soda ash from a light density soda ash which was prepared by calcining either sodium sesquicarbonate or sodium bicarbonate crystals. The process of the invention consists in treating said light density soda ash with completely gaseous water vapor at temperatures below 125° C. whereby an excess of 1 mol of water is absorbed within the crystalline structure of the original crystalline form from which the soda ash was derived. Subsequent calcining gives a densified soda ash having the crystal pseudomorph of the starting crystalline form.

As is well known, for many purposes a soda ash of a higher bulk density with less dusting is required for various manufacturing processes. Most of these varities of dense soda ash are produced by liquid hydration of light soda ash with controlled amounts of water to precipitate from the solution a crystalline sodium carbonate monohydrate which is then dehydrated or calcined. The resulting ash is of a higher bulk density and normally is about 58 to 62 pounds per cubic foot (loosely packed). However, this dense ash of commerce has particles of widely varying shapes and dimensions and this product likewise dusts objectionably on handling.

Another method of preparing a dense soda ash is to heat light ash to the point of fusion and then break up the resultant fused or sintered anhydrous soda ash particles into discrete small particles by grinding. This process is uneconomical and also results in a varied particle size of the final product.

A further method of producing dense soda ash is to precipitate anhydrous sodium carbonate directly from a solution of sodium carbonate and water. This requires use of pressure and high temperature, since anhydrous sodium carbonate crystallizes from water at temperatures above 110° C, which renders the process costly and complicated.

As mentioned above, the dense soda ash prepared by liquid hydration of light ash and calcination still suffers the drawback of non-uniformity and dusting. This is due to the fact that upon calcining or dehydrating any form of water-containing crystalline sodium carbonate or bicarbonate or mixtures thereof, the anhydrous sodium carbonate which is produced retains the skeleton form of the crystals that were calcined. The crystalline form of sodium carbonate monohydrate is an elongated orthorhomb wherein two triangular prisms are separated by a rectangular hexahedron. The monohydrate crystals exhibit much twinning, have many irregular forms and are quite thin. The greater preponderance of these crystals are more than two and a half times as long (measured in a direction parallel to the major or longitudinal axis of the crystal) as the next longest dimension measured along a crystal axis at right angles to the major axis. The third dimension is appreciably smaller than the second or next longest dimension and the crystals can be described as elongated bipyramidal orthorhombs.

An example of formation of dense soda ash by liquid hydration of light ash produced by the ammonia soda process is described in British Patent No. 668,612. The said process comprises treating light ash with water or steam at 70 to 100° C. to obtain a water content of 20 to 25% of the mixture which converts the soda ash to regularly shaped prismatic crystals of sodium carbonate monohydrate which may be calcined to soda ash. As pointed out above, the soda ash produced by calcination of sodium carbonate monohydrate crystals is rather friable and dusts readily due to the voids in the skeletal structure when the molecule of water is lost.

It is an object of the present invention to produce a densified soda ash of uniform crystalline composition with slight, if any tendency toward dusting, by the hydration of light soda ash prepared either from sodium sesquicarbonate or from sodium bicarbonate with completely gaseous water vapor at temperatures below 125° C. and subsequently calcining the hydrated compound.

A further object of the invention is the preparation of a densified soda ash having the crystal pseudomorph of sodium sesquicarbonate.

Another object of the invention is to produce sodium carbonate containing about 1 mol or a slight excess of water and having a crystalline form pseudomorphic with either sodium bicarbonate or sodium sequicarbonate.

These and other objects of the invention will become more apparent as the description thereof proceeds.

I have found that when soda ash prepared by calcining either sodium sesquicarbonate crystals or sodium bicarbonate crystals is hydrated by treatment with completely gaseous water vapor at a temperature below 125° C. for a period of time from two minutes to about one hour, depending upon the temperature used, the soda ash hydrates to form sodium carbonate containing about 1 mol to about 1.3 mols of water but retains the crystalline structure of the original crystalline form of the precursor to the soda ash. This is totally unexpected since hydration of sodium carbonate in the presence of liquid water or steam with condensed water causes recrystallization with the formation of crystalline sodium carbonate monohydrate having the distinct crystalline structure of sodium carbonate monohydrate crystallized from solution. While temperatures substantially below 125° C. may be employed, at temperatures below 70° C. the rate of hydration is no longer commercially practicable and at temperatures above the boiling point at the particular elevation of the plant site, superatmospheric pressures must be employed. While the range of working temperatures is thus between 70° C. and 125° C., it is preferable to operate between 80° C. and 112° C.

Light soda ash of commerce is formed by calcining sodium bicarbonate crystals formed through the ammonia soda process. This light soda ash of commerce has a loosely packed bulk density of about 29 pounds per cubic foot. A medium density soda ash is formed by calcining crystals of sodium sesquicarbonate. This ash has a density of about 44 pounds per cubic foot.

By ordinary methods of crystallization of sodium sesquicarbonate, especially those methods employed in the preparation of sodium sesquicarbonate from impure trona mineral deposits as found in Green River, Wyo., which methods are exemplified by Pike United States Patent No. 2,639,217, a sodium sesquicarbonate salt crystal is obtained which is of inferior quality with respect to crystal shape, purity, size, uniformity, resistance to breakage and bulk density. Similarly, the production of sodium bicarbonate by crystallization of a sodium bicarbonate solution results in crystal particles which are agglomerates of very fine crystals. Photomicrographs of the crystalline form of sodium sesquicarbonate prepared either in the laboratory or in the plant may be seen in the United States patent to Bauer et al. 2,954,282, FIGS.

1 and 3. Photomicrographs of crystalline sodium bicarbonate produced from sodium bicarbonate solutions may be seen in the United States Patent No. 3,072,466 of Bauer et al., especially FIGS. 1 and 3.

A sodium carbonate containing about 1 mole to about 1.3 mols of water prepared by steam hydration of either types of these crystals and retaining the same pseudomorphic form as the starting crystals would, even after undergoing densification according to the present process, suffer some of the same drawbacks as found in the soda ash prepared by calcining sodium carbonate monohydrate crystals of the prior art.

I have now found, and this represents the optimum feature of my invention, that a soda ash which has been formed by calcining sodium sesquicarbonate crystals as obtained in the presence of a crystalline modifier according to the United States Patent 2,954,282 and soda ash obtained by calcining sodium bicarbonate crystals obtained in the presence of a crystalline modifier according to United States Patent No. 3,072,466, can be materially improved by completely gaseous water vapor hydration as described above wherein there is formed hydrated sodium carbonate containing excess absorbed water which retains the original external crystalline form excepting that a shrinkage of the original porous pseudomorph has occurred due to the formation (crystallization) of the hydrate. On calcining this hydrated sodium carbonate, the optimum results are obtained.

By proceeding according to the invention, I have been able to increase the density of light soda ash approximately 5% to 17% without changing the physical characteristics of the crystals being treated. The sodium sesquicarbonate crystals and the sodium bicarbonate crystals, as produced in the two above-mentioned processes, in the presence of a crystalline modifier are uniform large crystals of substantially equal size. The sodium sesquicarbonate crystals are rod shaped while the sodium bicarbonate crystals are cylindrical. Calcination of these crystals results in a soda ash having the same crystalline structure as the original crystals. Completely gaseous water vapor hydration causes a shrinkage of the crystals but the original crystalline skeletal structure is preserved. Approximately a 5% to 17% increase in bulk density is obtained and the same crystalline form as the starting material is had. While the bulk density of soda ash formed from sodium bicarbonate is not increased to the extent that is obtained when the light soda ash is converted to sodium carbonate monohydrate crystals and these crystals are thereafter calcined to give a dense ash, the product of my invention in the pseudomorphic form of the sodium bicarbonate crystalline structure has a bulk density of approximately 35 pounds per cubic foot. This product is completely free of dusting and is substantially homogeneous, meeting a need in the industry for a dustless ash in the medium weight classification.

When a soda ash formed from sodium sesquicarbonate according to U.S. Patent No. 2,954,282 is completely gaseous water vapor hydrated according to the invention and thereafter calcined, a soda ash pseudomorphic in crystalline structure to sodium sesquicarbonate is obtained with a bulk density of about 52 pounds per cubic foot which, due to its crystalline structure, is non-friable and free of dusting.

In the accompanying drawings:
FIG. 1 is a view of a steam tube calciner.
FIG. 2 is a cross-sectional view of the steam tube calciner of FIG. 1 along line A—A.
FIG. 3 is a comparative photomicrograph of crystals of soda ash. The crystals on the right hand side are of soda ash produced from sodium sesquicarbonate according to the process described in U.S. Patent No. 2,954,282. The crystals on the left hand side are of soda ash prepared by completely gaseous water vapor hydration and calcination of the soda ash crystals of the right hand side.

The mechanism of the process with relation to the preferred embodiment starting from trona is:

(1) Conversion of sodium sesquicarbonate ($Na_2CO_3 \cdot NaHCO_3 \cdot 2H_2O$) to soda ash, leaving a porous opaque crystalline structure pseudomorphic with sodium sesquicarbonate as shown in FIG. 3, right hand side.

(2) Absorption of saturated water vapor (steam) or completely gaseous water vapor diluted to the desired level with air or other inert gas into the pores of the pseudomorph to give a shrunken translucent particle containing about 100% to 130% of the water required for the theoretical one mol of monohydrate water. This particle is also pseudomorphous after the original sodium sesquicarbonate. Recrystallization from solution in the normal sense does not occur.

(3) Conversion of the sodium carbonate containing from about 1 mole to about 1.3 mols of water, or "pseudomonohydrate" into soda ash, with little or no shrinking involved in the process. The visual appearance of the soda ash product is practically identical to that of the starting soda ash, as shown in FIG. 3, left hand side.

In the above process as practiced in the plant, according to FIGS. 1 and 2, the soda ash having a porous opaque crystalline structure pseudomorphic with sodium sesquicarbonate is fed into a rotating steam tube calciner 1 through the feed inlet 3. The rotating caliner 1 contains a plurality of steam tubes 2 around the circumference of the calciner 1 and running the entire length of said calciner. Steam at a temperature of about 125° C. is passed through the steam inlet 5 to a steam header 6 and into steam tubes 2. The steam from the tubes 2 is condensed in its passage through the calciner due to loss of heat and the condensed steam passes to a condensate header 7 and out the condensate outlet 8. In the upper zone of the rotating calciner 1, labeled "steaming zone," are a series of steam orifices 9 where sufficient steam or completely gaseous water vapor is introduced directly into the soda ash feed to provide an excess of from 1 to 30% of 1 mole of completely gaseous water vapor for every mol of soda ash. In the aforesid steaming zone, the soda ash is hydrated by absorption of the water vapor into the pores of the soda ash having a crystalline structure pseudomorphic with sodium sesquicarbonate to give a shrunken translucent particle containing an excess of the theoretical one mol of water. The hydrated soda ash then passes through the vapor baffle 10 into the calcining zone of the rotating calciner where the water of hydration is removed. The steam vapor produced is passed through gas outlet 11 provided with a suitable trap to maintain the desired vapor pressure. The dehydrated or calcined densified soda ash having a crystalline structure pseudomorphic with sodium sesquicarbonate is obtained at the soda ash outlet 4.

It is also possible to obtain a soda ash pseudomorphic after sodium sesquicarbonate without first calcining the sodium sesquicarbonate by calcining sodium sesquicarbonate under the above conditions in the presence of completely gaseous water vapor to obtain a sodium carbonate containing from about 1 mol to about 1.3 mols of water pseudomorphous with the original sodium sesquicarbonate crystalline structure and thereafter calcining in the same steam tube rotating calciner by slight modification of the above process. This results in a densification with the expenditure of an amount of energy equal to that ordinarily required to go from sodium sesquicarbonate to soda ash according to the thermodynamic balance. A reaction scheme for this reaction is as follows:

(1) $$Na_2CO_3 \cdot NaHCO_3 \cdot 2H_2O \rightleftharpoons 3/2\, Na_2CO_3 \cdot H_2O + 1/2 CO_2\uparrow + H_2O\uparrow$$

(2) $$3/2\, Na_2CO_3 \cdot H_2O \rightleftharpoons 3/2 Na_2CO_3 + 3/2 H_2O\uparrow$$

The first reaction of partial dehydration of sodium sesquicarbonate is preferably conducted in two stages or zones in the calciner according to the following reaction scheme:

(1a)  $Na_2CO_3 \cdot NaHCO_3 \cdot 2H_2O$
$\rightleftharpoons 1/3\ (3NaHCO_3 \cdot Na_2CO_3) + 2/3 Na_2CO_3 \cdot H_2O + 4/3 H_2O$ (1b)  $1/3\ (3NaHCO_3 \cdot Na_2CO_3) + 1/3 H_2O$
$\rightleftharpoons 5/6\ Na_2CO_3 \cdot H_2O + 1/2 CO_2$ which, when these equations are added, becomes Equation 1 above.

According to these reactions, it is obvious that the reaction to sodium carbonate monohydrate will be impeded if the water vapor pressure is too high, and if it is too low, at any given temperature, no sodium carbonate monohydrate will form. Under optimum reaction conditions the reaction is not complete and mixed crystals are obtained. The densification is therefore not as great as that obtained by the preferred method of steam hydration of light soda ash.

According to one mode of operation of my invention, calcined sodium sesquicarbonate, which sesquicarbonate is preferably obtained according to U.S. Patent No. 2,954,282, is reacted with steam by causing a stream of calcined sodium sesquicarbonate and anhydrous steam in an amount of from 1% to about 30% over the theoretical required to produce a monohydrate to intermingle at a temperature of between 100 to 112° C. over a period of from 2 to 60 minutes depending upon the temperature. A 100% conversion of the soda ash into sodium carbonate containing from about 1 mol to about 1.3 mols of water takes place with no change in crystalline structure. Upon calcining the hydrated sodium carbonate, the bulk density is found to be approximately 52 pounds per cubic foot as compared with the starting material having a bulk density of about 44 pounds per cubic foot. Thus, a densified soda ash is produced which is unique in its morphology. The ingredients are caused to react by flowing the steam through the soda ash or by using a fluidized bed reaction. Under the same conditions, comparable results are obtained using soda ash obtained from sodium bicarbonate crystals preferably as modified according to U.S. Patent No. 3,072,466. It is, however, necessary to consider the time of reaction since, with long reaction times, it is possible that sufficient moisture would be picked up from condensation of the anhydrous steam to convert the hydrated sodium carbonate into the normal monohydrate crystalline form. However, by limiting the amount of steam present, the amount of water pick-up is controlled. While it is desirable to have the crystals pick up an excess of water over that required for a direct monohydration, from 1 to 30% water in excess of the equimolecular amount is sufficient.

While I do not wish to be bound by any theory, microscopic and particle density studies give some indication of a shrinkage of the crystalline structure as above indicated on completely gaseous water vapor hydration, thus causing the increase in bulk density after subsequent calcining. The temperature of final calcining is not important since this shrinkage has already taken place. The rate of water removal does not change the particle size.

The following examples disclose several embodiments illustrating the invention. It should be understood, however, that the invention is not to be deemed limited to these embodiments.

*Example I*

Sodium sesquicarbonate crystals prepared according to United States Patent No. 2,954,282 were calcined at a temperature of about 200° C. and cooled. Thereafter, this soda ash was placed in a reaction chamber held in an average temperature of 102° C. and superheated steam was passed through the reaction chamber and over the soda ash at a flow rate of 12 cc. of $H_2O$ per minute. After varying lengths of time, samples of the steam hydrated soda ash were withdrawn and inspected microscopically and by X-ray analysis. Table I shows the results of this experiment.

TABLE I

| Reaction Time (min.) | X-ray Analysis | Optical Description |
| --- | --- | --- |
| 10 | 90±5% $Na_2CO_3 \cdot H_2O$<br>10±5% $Na_2CO_3$ | $Na_2CO_3 \cdot H_2O$ clear to translucent, pseudomorphous after sesquicarbonate crystals. |
| 15 | 90±5% $Na_2CO_3 \cdot H_2O$ | Equal amounts of clear to translucent pseudomorphs and clear irregular aggregates. |
| 30 | 90±5% $Na_2CO_3 \cdot H_2O$<br>10±5% $Na_2CO_3$ | Same as 15 min. sample. |
| 60 | 90±5% $Na_2CO_3 \cdot H_2O$<br>5±5% $Na_2CO_3$ | Mostly clear, irregular crystals. |
| 90 | 95±5% $Na_2CO_3 \cdot H_2O$<br>5% $Na_2CO_3$ | Same as 60 min. sample. |

The semiquantitative X-ray defraction analysis of the samples showed that most of the conversion was accomplished in ten minutes and a further reaction caused a recrystallization of the hydrated soda ash which had taken the form of the sesquicarbonate pseudomorph into its own stable monohydrate form. The said recrystallization into the monohydrate form after long reaction times is what occurs in British Patent No. 668,612. As pointed out above, when the said monohydrate crystals are calcined, the soda ash is friable and readily dusts which does not occur with soda ash produced from the hydrated soda ash of the invention.

*Example II*

Soda ash prepared similarly to the above was treated at 100° C. with superheated steam. The results are indicated in Table II.

TABLE II.—SODA ASH PREPARED FROM SODIUM SESQUICARBONATE CALCINED AT 110° C.
[Steam flow rate—0.6 cc. $H_2O$/min.]

| Reaction Time (min.) | Percent Theoretical Monohydrate | Optical Description |
| --- | --- | --- |
| 15 | 41 | Equal amount opaque and translucent. |
| 20 | 100 | Clear pseudomorphs. |
| 30 | 100 | Clear pseudomorphs. |

SODA ASH PREPARED BY CALCINING AT 204° C.

| 20 | 100 | Translucent pseudomorphs. |
| 25 | 100 | Translucent pseudomorphs. |

These results indicated that complete reaction took place between 15 and 20 minutes. It can also be noted from the table that calcining the sodium sesquicarbonate at temperatures of 110° C. or temperatures of 204° C. did not effect the hydration reaction. The complete reaction took place without any caking. The difference in time for complete reaction between this example and Example I is due in part to the fact that the course of the reaction was followed gravimetrically whereas in Example I it was followed by X-ray analysis.

*Example III*

Soda ash prepared as in Example I was reacted with steam at 100° C. as in Example II for a period of 10 minutes. The amount of water picked up was calculated and the percent of water with reference to the theoretical amount of water for monohydrate was found to be 123%. The hydrated crystals were calcined at 110° C. and the Table III shows the results of a number of runs under the above conditions.

TABLE III.—DENSIFICATION OF SODA ASH USING COMPLETELY GASEOUS WATER VAPOR

| Starting Material | Temp., °C. | Mols of H₂O per Mol of Ash | Bulk Density of Ash | | | | Percent Increase | Particle Density, gm./cc. | |
|---|---|---|---|---|---|---|---|---|---|
| | | | Before Treatment | | After Treatment | | | Before | After |
| | | | Gm./cc. | Lbs./ft.³ | Gm./cc. | Lbs./ft.³ | | | |
| Soda Ash prepared from Sodium Sesquicarbonate. | 70 | 1.47 | 0.743 | 46.4 | 0.768 | 47.9 | 3.4 | | |
| | 70 | 1.95 | 0.697 | 43.5 | 0.727 | 45.4 | 4.3 | | |
| | 80 | 1.20 | 0.714 | 44.5 | 0.808 | 50.4 | 13.2 | | |
| | 80 | 1.29 | 0.714 | 44.5 | 0.827 | 51.6 | 15.8 | | |
| | 80 | 1.29 | 0.692 | 43.2 | 0.804 | 50.2 | 16.2 | 1.81 | 1.90 |
| | 80 | 1.47 | 0.743 | 46.4 | 0.785 | 49.0 | 5.6 | | |
| | 85 | 1.16 | 0.715 | 44.6 | 0.770 | 48.0 | 7.7 | | |
| | 85 | 1.21 | 0.715 | 44.6 | 0.790 | 49.3 | 10.5 | 1.81 | 1.92 |
| | 85 | 1.21 | 0.714 | 44.5 | 0.796 | 49.7 | 11.5 | | |
| | 88 | 1.21 | 0.715 | 44.6 | 0.783 | 48.8 | 9.5 | | |
| | 90 | 1.19 | 0.715 | 44.6 | 0.775 | 48.4 | 8.4 | | |
| | 95 | 1.21 | 0.714 | 44.5 | 0.775 | 48.4 | 8.6 | | |
| Soda Ash prepared from Solvay Process. | 75 | 1.29 | 0.477 | 29.8 | 0.533 | 33.2 | 11.7 | | |
| | 80 | 1.20 | 0.469 | 29.3 | 0.505 | 31.5 | 7.7 | | |
| | 85 | 1.28 | 0.469 | 29.3 | 0.491 | 30.6 | 4.7 | | | density of the ash produced was determined to be approximately 52 pounds per cubic foot as compared to the density of the starting ash of approximately 44 pounds per cubic foot. FIG. 3, right hand side, is a photomicrograph of the starting soda ash before steam hydration, and the left hand side is a photomicrograph of the same soda ash after hydration and calcining. It is apparent that substantially no change in crystalline form has occurred and that the hydrated and calcined soda ash retains the pseudomorphic crystalline form of the starting sesquicarbonate crystals.

*Example IV*

In order to determine the effect of completely gaseous water vapor hydration of soda ash produced from calcined sodium sesquicarbonate prepared according to United States Patent No. 2,954,282, the following experiments were performed.

A Morton type round bottom flask was connected to an Erlenmeyer flask by means of a ground glass joint. On the female joint there was a side tube which lined up with a hole in the male, which allowed the assembled apparatus to be opened or closed to the atmosphere simply by turning the joint. The assembly was attached to a chain-driven rotor mechanism which was lowered into a large constant temperature oil bath.

Soda ash, produced as above, was weighed into the Morton flask. Water was weighed into the Erlenmeyer flask, and then frozen. The two flasks were joined, and the system evacuated through the side arm. The joint was then sealed, and the apparatus, now clamped to the rotor, was lowered into a large constant temperature oil bath while rotating.

The water vaporized and was absorbed by the ash in from 30 to 60 minutes, depending upon the temperature. Occasional tapping of the Morton flask was beneficial. When no liquid water was left, the apparatus was lifted out of the bath; the joint was quickly turned to open the flask to the atmosphere, and held open by means of a special pin. The entire apparatus was now swung over a 110° C. oil bath, and lowered in. Water vapor bubbled rapidly out of the rotating spout. When about half of the water had been driven off (15 minutes), the assembly was removed from the bath, and the ash was removed from the Morton flask to be calcined to completion in a 140° C. oven. The purpose of the second bath was to effect an in situ partial recalcination which eliminated formation of crystal "stacks" usually obtained on static oven calcination.

From 0.2% to 0.4% "Cab-O-Sil," a finely divided silica anti-caking agent, was added to the ash before the run. In one case, it was purposely omitted and was found to be unnecessary.

In all cases, an excess of one mol of water was added to the soda ash but as can be seen from the table, the bulk density of the soda ash falls below 48 pounds per cubic foot over the critical upper limit of 1.3 mols of water per mol of soda ash or 18% of water by weight of the hydrated soda ash. The examples using 1.47 and 1.96 mols of water per mol of soda ash are examples of the amounts of water used in the process of British Patent No. 668,612.

When operating at temperatures below the boiling point of water at the particular elevation of the plant site, steam may be diluted with air or some or other inert gas before contacting the crystals, where the partial pressure of water may be adjusted by controlling the boiling rate, and the air flow rate through the boiler.

It is to be understood that the invention is not to be construed as limited to the preceding specific embodiments. As will be obvious to one skilled in the art, various changes and modifications may be made without departing from the spirit of the invention and the scope of the appended claims.

I claim:

1. A process of densifying soda ash without changing its crystalline structure which comprises treating a soda ash obtained by calcining a precursor selected from the group consisting of sodium sesquicarbonate and sodium bicarbonate with completely gaseous water vapor in an amount of from about 1 mol to about 1.3 mols of water for every mol of sodium carbonate at a temperature of from 70° C. to 125° C. for a time sufficient to hydrate said soda ash without recrystallization to sodium carbonate monohydrate whereby the soda ash retains its original external crystal morphology, calcining said hydrated soda ash and recovering a densified soda ash having a crystalline structure pseudomorphic with its precursor.

2. A process of densifying soda ash without changing its crystalline structure which comprises treating a soda ash derived by calcining sodium sesquicarbonate with an excess of completely gaseous water vapor whereby said soda ash absorbs from 101% to 130% of the amount of water required to form one mol of water of hydration at a temperature of from 80° C. to 112° C., for a time sufficient to hydrate said soda ash without recrystallization to sodium carbonate monohydrate whereby the soda ash retains its original external crystal morphology, calcining said hydrated soda ash and recovering a densified soda ash having a crystalline structure pseudomorphic with sodium sesquicarbonate.

3. The process of claim 2 wherein said calcined sodium sesquicarbonate was crystallized in the presence of crystal modifiers to obtain uniform large crystals of substantially equal size.

4. A process of densifying soda ash without changing its crystalline structure which comprises treating a soda ash derived by calcining sodium bicarbonate with an excess of completely gaseous water vapor whereby said soda ash absorbs from 101% to 130% of the amount of water required to form one mol of water of hydration at a temperature of from 80° C. to 112° C. for a time sufficient to hydrate said soda ash without recrystallization to sodium carbonate monohydrate whereby the soda ash retains its original external crystal morphology, calcining said hydrated soda ash and recovering a densified soda ash having a crystalline structure pseudomorphic with sodium bicarbonate.

5. The process of claim 4 wherein said calcined sodium bicarbonate was crystallized in the presence of crystal modifiers to obtain uniform large crystals of substantially equal size.

6. A process of preparing a densified soda ash having a crystalline structure corresponding to sodium sesquicarbonate which comprises the steps of treating sodium sesquicarbonate with an excess of completely gaseous water vapor at a temperature of from 70° C. to 125° C. whereby said sodium sesquicarbonate is converted to a soda ash containing from 101% to 130% of the amount of water required to form one mol of water of hydration without change of its crystalline structure and without recrystallization of the soda ash to sodium carbonate monohydrate, calcining said hydrated soda ash and recovering a densified soda ash having a crystalline structure pseudomorphic with sodium sesquicarbonate.

References Cited by the Examiner
UNITED STATES PATENTS

| | | | |
|---|---|---|---|
| 2,954,282 | 9/1960 | Bauer et al. | 23—63 X |
| 3,188,170 | 6/1965 | Mantz et al. | 23—63 |

FOREIGN PATENTS 668,612    3/1952    Great Britain.

OSCAR R. VERTIZ, *Primary Examiner.*

G. OZAKI, *Assistant Examiner.*